(12) United States Patent
Hasnaoui

(10) Patent No.: US 11,701,284 B2
(45) Date of Patent: Jul. 18, 2023

(54) COFFIN IN PARTICULAR FOR BURIAL IN THE GROUND

(71) Applicant: Mansour Hasnaoui, Sin le Noble (FR)

(72) Inventor: Mansour Hasnaoui, Sin le Noble (FR)

( * ) Notice: Subject to any disclaimer, the term of this patent is extended or adjusted under 35 U.S.C. 154(b) by 242 days.

(21) Appl. No.: 17/290,702

(22) PCT Filed: Oct. 7, 2019

(86) PCT No.: PCT/IB2019/058523
§ 371 (c)(1),
(2) Date: Apr. 30, 2021

(87) PCT Pub. No.: WO2020/089713
PCT Pub. Date: May 7, 2020

(65) Prior Publication Data
US 2022/0015975 A1    Jan. 20, 2022

(30) Foreign Application Priority Data
Oct. 31, 2018   (FR) ...................................... 1871344

(51) Int. Cl.
*A61G 17/007*    (2006.01)
*A61G 17/04*    (2006.01)
*A61G 17/02*    (2006.01)

(52) U.S. Cl.
CPC .......... *A61G 17/007* (2013.01); *A61G 17/02* (2013.01); *A61G 17/044* (2016.11); *A61G 17/047* (2016.11); *A61G 2210/90* (2013.01)

(58) Field of Classification Search
CPC .... A61G 17/007; A61G 17/044; A61G 17/02; A61G 17/047; A61G 17/041; A61G 2210/90

USPC .................................................. 27/3, 11, 12
See application file for complete search history.

(56) References Cited

U.S. PATENT DOCUMENTS 3,964,140 A * 6/1976 Gauchard ............ A61G 17/047
                                                                                          27/11
4,924,565 A * 5/1990 Rathjen .............. A61G 17/0136
                                                                                          27/11
4,951,367 A * 8/1990 Wolfe .................. A61G 17/042
                                                                                          27/19
5,092,020 A * 3/1992 MaGuire ................ A61G 17/04
                                                                                          27/19

(Continued)

FOREIGN PATENT DOCUMENTS

DE              19926579         1/2001
DE              19948782         5/2001

(Continued)

OTHER PUBLICATIONS

Search Report and Written Opinion issued in Int'l Appl. No. PCT/IB2019/058523 (dated 2019).

*Primary Examiner* — William L Miller
(74) *Attorney, Agent, or Firm* — Barnes & Thornburg LLP; G. Peter Nichols

(57) ABSTRACT

A coffin, in particular for burial in the ground, includes a bottom, side walls, a lid, a mattress and collecting means capable of receiving vital fluids under the mattress. The coffin also has oxygen-storage means enabling oxygen to be introduced into the coffin, humidifying means and heating means so as to generate, over time, conditions which allow rapid decomposition of the body.

11 Claims, 1 Drawing Sheet

(56) References Cited

U.S. PATENT DOCUMENTS

| | | | |
|---|---|---|---|
| 5,444,900 A * | 8/1995 | Shawhan | A61F 13/51121 27/35 |
| 5,615,464 A * | 4/1997 | Rojdev | A61G 17/04 27/11 |
| 5,659,933 A | 8/1997 | McWilliams | |
| 8,104,152 B2 * | 1/2012 | Spiers | A61G 17/047 27/27 |
| 8,955,205 B2 * | 2/2015 | Beliveau | A61G 17/00 27/11 |
| 11,318,061 B2 * | 5/2022 | Houde | A61G 17/042 |
| 2005/0050701 A1 * | 3/2005 | Davis | A61G 17/041 27/28 |
| 2005/0210642 A1 * | 9/2005 | Darst | A01N 1/00 27/29 |
| 2020/0207675 A1 * | 7/2020 | Bernstein | A61G 17/002 |
| 2022/0015976 A1 * | 1/2022 | Hasnaoui | E04H 13/001 |

FOREIGN PATENT DOCUMENTS

| | | |
|---|---|---|
| DE | 10116113 | 10/2020 |
| WO | 2013/175518 | 11/2013 |

* cited by examiner

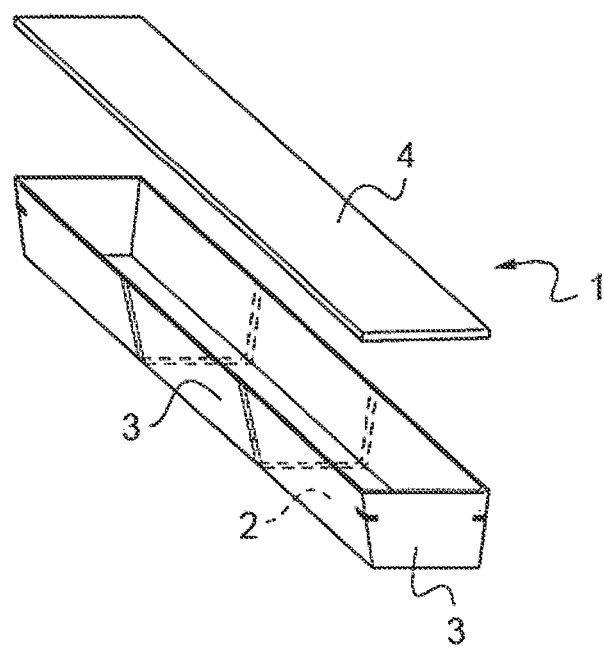
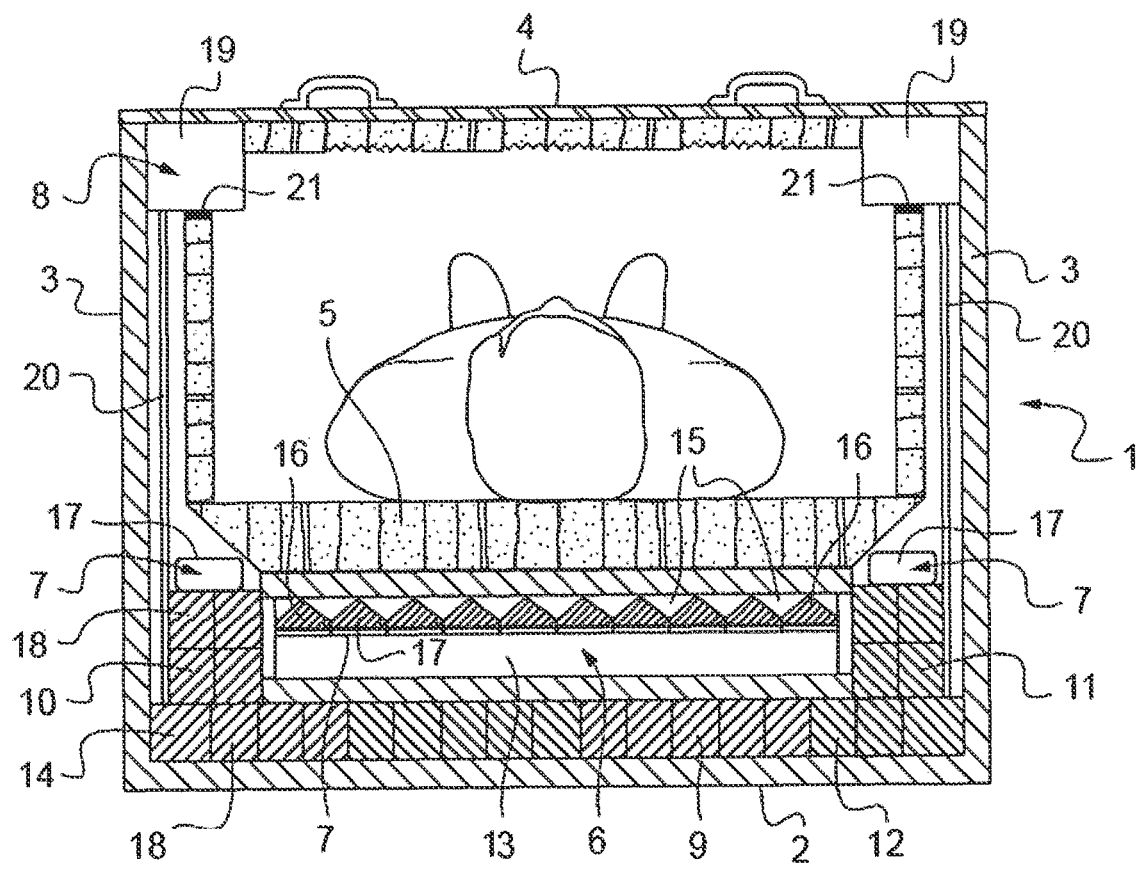

COFFIN IN PARTICULAR FOR BURIAL IN THE GROUND

This application is a U.S. nationalization under 35 U.S.C. § 371 of International Application No. PCT/IB2019/058523, filed Oct. 7, 2019, which claims priority to French Application No. 1871344, filed Oct. 31, 2018; the entire contents of each are incorporated herein by reference.

TECHNICAL FIELD

The invention is situated in the technical field of funeral parlors and more particularly that of techniques for burial of a coffin in the ground and preservation thereof.

That application is not limiting on the invention, however, and the coffin could equally be used to accommodate a body in a vault or a funeral parlor.

PRIOR ART

At present, coffins are able to receive bodies and include means for accompanying the putrefaction of the bodies and in particular allowing evacuation and treatment of bodily fluids. In particular, some coffins provide a mattress, on which the body rests, containing absorbent and filter materials and in particular materials based on active carbon.

That mattress may further be disposed vertically above a reservoir for collecting fluids filtered by the mattress and enabling potentially pollutant leaks to the outside to be prevented. That type of coffin also enables soiling of the body to be limited and, by evacuating some of the fluids, to some degree allows decomposition of the body by aerobic bacteria. However, even in the presence of a filter mattress the inside of the coffin is often placed under conditions that are either too humid and anaerobic, leading to saponification of lipids responsible for the formation of adipocere preventing the decomposition of the body, or too dry, leading to mummification of the body.

At present coffins do not provide devices for accelerating the decomposition of the body under conditions comparable to a natural decomposition time in the open air. At present the complete decomposition of a body given the structures of the coffin requires a more than eight years. This very long delay depends on numerous factors including the seal of the coffin, the climatic conditions and the products used for embalming and contributing to the preservation of the body, such as formaldehyde.

This very long delay causes numerous problems, in particular, for gravediggers; the incomplete decomposition of the body or the cadaver considerably increases the biological risks during either lowering of the coffin or exhumation in order to place the bones in an ossuary, exhumation required by the commune at the end of the use of the burial plot. In fact, in the event of incomplete decomposition the gravedigger comes into contact with pathogenic germs present in the body that can give rise to risks of infection.

Moreover, from the ethical point of view the manipulation of bodies when decomposition is incomplete may be traumatizing for families that sometimes request exhumation or even for the staff of the funeral parlor.

More prosaically, the very slow decomposition of bodies generates lack of room in cemeteries with the consequence of requests for burial being rejected in some towns. For example, to illustrate the phenomenon, the city of Paris carries out each year approximately ten thousand burials and nine thousand exhumations, of which twelve hundred are at the request of the family.

SUMMARY OF THE INVENTION

The present invention concerns a coffin, in particular for burial in the ground, including a bottom, side walls, a lid, a mattress and collecting means capable of receiving vital fluids under the mattress, characterized in that the coffin also includes oxygen-storing means enabling oxygen to be introduced into the coffin, humidifying means and heating means so as to generate, over time, conditions which allow rapid decomposition of the body.

Resulting Advantages

A first aim of the present invention is to solve some or all of the technical problems linked to the aforementioned prior art.

The present invention has for object alleviating the aforementioned disadvantages by proposing a coffin allowing rapid decomposition of the body, in particular within a year.

The present invention also has for object proposing a coffin enabling rapid decomposition of the body without particular intervention of the funeral parlor staff once burial has been effected.

The present invention also has for object proposing a coffin allowing rapid decomposition of the body whatever the influence of the climate or of the soil on the coffin.

The present invention also has for object proposing a coffin allowing rapid decomposition of the body using natural products compatible with environmental standards.

BRIEF DESCRIPTION OF THE DRAWINGS

The present invention will be better understood after reading a detailed embodiment with reference to the appended figures, provided by way of nonlimiting example, in which:

FIG. 1 represents a schematic perspective view of one embodiment of a coffin in accordance with the invention, FIG. 2 represents the coffin from FIG. 1 in lateral section.

DESCRIPTION OF THE EMBODIMENTS

The present invention aims to protect a coffin such as is represented in FIGS. 1 and 2. Referring to FIG. 1, there is seen to be represented a coffin 1 in accordance with the invention, in particular for burial in the ground. The latter coffin includes, in known manner, a bottom 2, lateral walls 3, a lid 4, a mattress 5 and collecting means 6 adapted to receive vital fluids under the mattress 5.

In accordance with the invention, the coffin 1 includes technical means enabling acceleration of the decomposition of the body; to this end the coffin 1 is further equipped with oxygen-storing means 7 enabling introduction of oxygen into the coffin, humidifying means 8 and heating means 9. The combination and the activation of the oxygen-storing means 7, the humidifying means 8 and the heating means 9 enabling generation over time of conditions allowing rapid decomposition of the body.

On this subject, it is important to note that the storage means could contain pure oxygen or a mixture containing oxygen and air for example. The objective of this introduction of oxygen is to stimulate aerobic bacteria by increasing the oxygen level in the coffin 1. In present day coffins the oxygen level is very low given the decomposition gases emanating from the body and non-renewal of the air in the hermetically sealed coffin, which leads to rapid disappearance of the aerobic macrophage bacteria.

Referring to FIG. 2 illustrating a schematic sectional view of the coffin 1, it is seen that the mattress 5 rests on a double-wall plate 10 with an apertured upper wall 11 allowing fluids to pass through and a lower wall 12 receiving a fluid receiving tray 13, the double-wall 10 also including a sloping intermediate plate 14 for guiding the fluids toward the receiving tray 13.

When the body fluids are able to flow out, they pass through the mattress 5, the constituents of which partly filter the fluids, and thereafter flow through the apertured upper wall 11 and come into contact with the intermediate plate 14. The fluids are then guided along the slope and come to fill the receiving tray 13.

Check valves are advantageously provided preventing any upward flow of fluid out of the receiving tray 13.

In the example from FIGS. 1 and 2 the intermediate plate 14 has a corrugated profile with substantially W-shaped corrugations, although other shapes can equally be envisaged for guiding the fluids toward the tray 13, for example a simple V shape enabling a single flow gutter to be constituted. The advantage of a corrugated profile intermediate plate 14 is in particular to provide alternately flow spaces 15 forming a gutter with free spaces 16 allowing partial reception of the oxygen-storing means 7 and/or the humidifying means 8.

The heating means are advantageously disposed between the bottom 2 of the coffin 1 and the double-wall plate 10. This positioning allows efficient heating to be produced for heating the body.

In accordance with another advantageous embodiment the oxygen-storing means 7 include at least one oxygen pocket 17 made from a hydrosoluble material.

As indicated above, the double-wall plate 10 further allows reception of at least a part of the oxygen-storing means 7 and the humidifying means 8. Thus the oxygen-storing means 7 include at least one oxygen pocket 17 disposed in the double-wall plate 10. Other locations of the hydrosoluble pockets 17 can equally be envisaged and in particular at the level of the lateral walls 3 of the coffin 1. Numerous pockets 17 are advantageously provided with different strengths so as to allow successive ruptures and regular supply of oxygen to the coffin 1.

In an advantageous manner the heating means 9 include a layer of compost 18. This layer of compost 18 is advantageously disposed under the double-wall plate 10 and activated by impregnation with liquid by means of the humidifying means 8.

The parameters relating to the nature of the compost and the quantity of compost are important because the compost must make it possible on the one hand to generate a high heat for the destruction of pathogens and on the other hand to generate a constant heat to assure regular heating of the body facilitating its decomposition. There is in particular chosen in the example a natural compost enabling high heat at greater than 80° C. to be created on activation in such a manner as to destroy pathogenic bacteria present in the coffin. This compost will advantageously have a dry weight between 5 and 25 kg inclusive.

Referring to FIG. 2 it is seen that the coffin 1 includes humidifying means 8 with a reservoir 19, advantageously disposed at the level of the lid 4. This reservoir is able to contain liquids, those liquids being intended to increase the relative humidity in the coffin.

The humidifying means also allow activation of the compost 18 in the situation of using compost-based heating means described above.

At least one pipe 20 is provided for transferring the liquids. This pipe allows transfer of liquid from the reservoir 19 to the bottom 2 of the coffin 1. To this end a valve 21 is provided between the reservoir 19 and the pipe 20 allowing controlled transfer of the liquid to the interior of the coffin.

In accordance with a first advantageous aspect, the valve 21 is a biodegradable or putrescible valve allowing the flow of liquid from the reservoir in the pipe in a particular time period, in particular between three and six months inclusive. That time period allows a first decomposition of the body to occur, in particular evacuation of gases and some fluids from the body.

In accordance with a second advantageous aspect the pipe 20 allows drop-by-drop flow so as not to saturate the interior of the coffin 1 with moisture whilst supplying the latter regularly therewith.

The reservoir 19 could be filled by an employee of the funeral parlor before lowering the coffin into the ground or, in humid regions, could possibly be filled by rainwater through the lid 4, the latter being equipped with filter openings allowing the liquids to pass to the reservoir 19.

In an advantageous manner the bottom 2 and/or the lateral parts 3 feature a rupture zone made of a putrescible material so that if the coffin is partly or completely flooded, in particular in the event of the water table rising, this rupture zone allows liquids to flow out of the coffin. In an advantageous manner the material used to produce this rupture zone is a biodegradable polymer of PLA type or a derivative thereof.

The functioning of the aforementioned coffin is as follows: when the body is placed in the coffin and the coffin is buried, the body putrefies, that is to say its organic tissues are destroyed by the effect of bacteria essentially present in the intestinal flora, saprophytic mycetes and other bacteria that invade the cadaver.

In a first phase, extending over several weeks to several months, the hydrosoluble pockets 17 present in the coffin rupture as and when decomposition proceeds because of the effect of the moisture increasing the level of oxygen in the coffin 1, which favors and maintains the activity of the aerobic bacteria responsible for the decomposition of the tissues.

In a second phase, once the valve 21 has ruptured and the liquids have been transferred via the pipe 20, the humidifying means bring about the activation of the heating means 9, namely the compost 18 in this example.

In a first, relatively short time period the compost 18 will give off high heat, greater than 100 degrees, allowing destruction of pathogenic agents present, and in a second time period continues to give off heat at a temperature above 10 degrees, for of the order of four to six months, which will have the effect of heating the body and improving its decomposition.

The coffin 1 therefore includes technical means for reconstituting conditions of temperature, relative humidity and optimum oxygen level for the complete decomposition of the body.

Of course, other features of the invention could equally be envisaged without departing from the scope of the invention defined by the following claims.

The invention claimed is:

1. A coffin for burial in the ground, including a bottom, side walls, a lid, a mattress and a fluid receiving tray capable of receiving vital fluids under the mattress, characterized in that the coffin also includes oxygen-storing means enabling oxygen to be introduced into the coffin, humidifying means and heating means so as to generate, over time, conditions which allow rapid decomposition of a body.

2. The coffin according to claim 1 in which the mattress rests on a double-wall plate with (i) an apertured upper wall allowing fluids to pass through it and (ii) a lower wall receiving the fluid receiving tray, the double-wall plate further including a sloping intermediate plate for guiding fluids toward the fluid receiving tray.

3. The coffin according to claim 2 in which the double wall is corrugated and further allows the reception of at least part of the oxygen-storing means and/or of the humidifying means at the level of free spaces.

4. The coffin according to claim 2 in which the oxygen-storing means include at least one oxygen pocket disposed in the double-wall plate.

5. The coffin according to claim 2 in which the heating means include a layer of compost disposed under the double-wall plate that can be activated by impregnation with liquid via the humidifying means.

6. The coffin according to claim 5 in which the compost is a natural compost allowing high heat above 80° C. to be created upon activation in such a manner as to destroy pathogenic bacteria present in the coffin.

7. The coffin according to claim 1 in which the oxygen-storing means include at least one oxygen pocket made from a hydrosoluble material.

8. The coffin according to claim 1 in which the humidifying means include a reservoir on the lid adapted to contain liquids, at least one pipe allowing transfer of liquid to the bottom of the coffin and a valve between the reservoir and the pipe allowing controlled transfer of liquid to the interior of the coffin.

9. The coffin according to claim 8 in which the valve is a biodegradable or putrescible valve allowing flow of liquid from the reservoir in the pipe in a time period between three and six months inclusive.

10. The coffin according to claim 1 in which the bottom and/or the sides walls include a rupture zone made of a putrescible material allowing flow of liquids out of the coffin and is a biodegradable polymer of PLA or a derivative thereof.

11. The coffin according to claim 1 in which check valves prevent any upward flow of the fluid out of the fluid receiving tray.

* * * * *